March 18, 1924.

L. W. THOMPSON 1,487,492

REGULATING SYSTEM

Filed May 28, 1923

Inventor:
Louis W. Thompson,
by *Alexander S. Lunt*
His Attorney

Patented Mar. 18, 1924.

1,487,492

UNITED STATES PATENT OFFICE.

LOUIS W. THOMPSON, OF SCHENECTADY, NEW YORK, ASSIGNOR TO GENERAL ELECTRIC COMPANY, A CORPORATION OF NEW YORK.

REGULATING SYSTEM.

Application filed May 28, 1923. Serial No. 641,821.

*To all whom it may concern:*

Be it known that I, LOUIS W. THOMPSON, a citizen of the United States, residing at Schenectady, county of Schenectady, State of New York, have invented certain new and useful Improvements in Regulating Systems, of which the following is a specification.

My invention relates to regulating systems and particularly to such systems in which the desired regulation is obtained by means of a regulating device having a rotatable element which is driven at a speed proportional to the condition to be regulated and a cooperating rotatable element driven at a speed in accordance with which said condition is to be controlled, said rotatable elements functioning to open and close a regulating circuit for periods varying with the relative angular position thereof.

In such systems the speed of one of the parts of said regulating device may change so much that the relative angular position of said rotatable elements causes the interruptions in the circuit controlled thereby to occur in such a manner as not to produce the desired regulation.

One object of my invention is to provide an arrangement whereby this undesirable operation of the regulating device under the conditions mentioned is prevented.

In accordance with my invention, the respective rotatable elements of the regulating device are provided whereby the amount of angular movement of said elements with respect to each other is limited.

My invention will be better understood from the following description taken in connection with the accompanying drawing and its scope will be pointed out in the appended claims.

Figure 1:
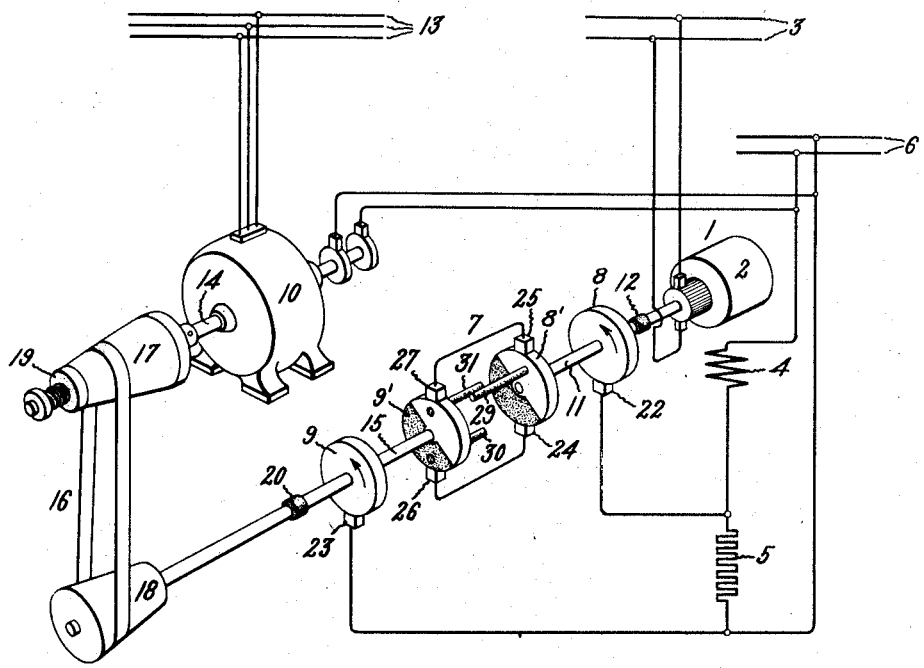
Figure 2:
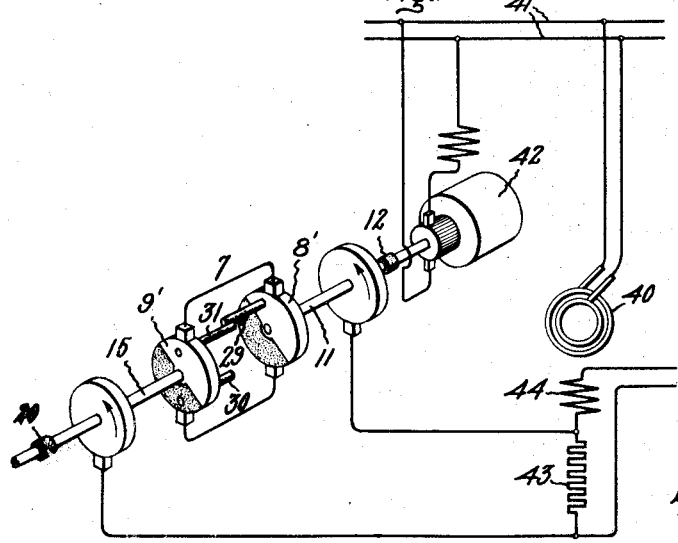

In the accompanying drawing, Fig. 1 is a diagram of a speed regulating system, embodying my invention for maintaining constant the speed of an electric motor, and Fig. 2 is a diagram showing a portion of a voltage regulating system embodying my invention.

Referring to Fig. 1 of the drawing, 1 is a direct current motor, the speed of which is to be controlled. The motor comprises an armature 2 which is connected across the supply circuit 3 and a field winding 4 which is connected through a resistance 5 to a supply circuit 6.

The speed of the motor 1 is controlled by the regulator 7 which opens and closes a short circuit around the resistance 5 in the field circuit of the motor. As shown, the regulator 7 comprises the slip rings 8 and 9 and the commutators 8' and 9'. The slip ring 8 and the commutator 8' are driven at a speed proportional to the speed of the motor 1. The slip ring 9 and the commutator 9' are driven at a speed in accordance with which the speed of the motor 1 is to be controlled. Since in the arrangement shown it is desired to maintain the speed of the motor 1 constant, the slip ring 9 and the commutator 9' are driven by a constant speed device shown as a synchronous motor 10. The commutator 8' and the slip ring 8 are mounted on a shaft 11 which is driven by the motor 1, the shaft 11 forming an electrical connection between the slip ring and the conducting segment of the commutator. The shaft 11 however, is insulated from the shaft of the motor 1 by means of the insulating connection 12. While I have shown the shaft 11 as being directly connected to the shaft of the motor, it is evident that any well known speed changing device may be provided between the two shafts so that any desired ratio of speed may be maintained between the motor 1 and the slip ring 8 and the commutators 8'.

The synchronous motor 10 comprises a field winding which is connected to a suitable source of current shown as the supply circuit 6 and an armature winding which is connected to the three phase supply circuit 13. The rotor shaft 14 of the synchronous motor 10 is connected to the shaft 15, on which the slip ring 9 and the commutator 9' are mounted, by means of a speed changing device 16 comprising the cone pulleys 17 and 18 mounted on the shafts 14 and 15 respectively. The cone pulley 17 is secured to the shaft 14 by a friction clutch 19, which may be of any suitable construction, so that pulley 17 rotates with the shaft 14 when the power transmitted by means of the cone pulleys is less than a predetermined amount. When the power exceeds this amount, however, the clutch slips so that pulley 17 rotates at a higher or lower speed than the synchronous speed of the motor, depending upon the direction in which power is being transmitted by the core pulleys.

The portion of the shaft 15, on which the slip ring 9 and the commutator 9′ are mounted and which is insulated from the rest of the shaft by the insulating portion 20, forms an electrical connection between the slip ring and the conducting portion of the commutator.

The slip rings 8 and 9 are respectively engaged by the brushes 22 and 23 which are connected to opposite ends of the resistance 5 in the field circuit of the motor 1. The commutators 8′ and 9′ are similar in construction, each comprising a conducting segment and an insulating segment which preferably extend 180 degrees around the commutator. The commutator 8′ is provided with the brushes 24 and 25 which are spaced 180 degrees apart and the commutator 9′ is provided with the brushes 26 and 27 which are spaced 180 degrees apart. The brush 24 is connected to the brush 26 and the brush 25 is connected to the brush 27.

The shafts 11 and 15 are in alignment and the commutators 8′ and 9′, which are adjacent to each other and which are arranged so that they rotate in the same direction relative to each other, are respectively provided with the stops 29 and the stops 30 and 31, whereby the angular movement of the two commutators is limited. In the particular arrangement shown the stops 30 and 31 are spaced 180 degrees apart and the stop 29 is so spaced that it engages the stop 30 when the angular position of the two commutators 8′ and 9′ is such that the resistance 5 is in the field circuit all of the time and engages the stop 31 when angular position of the two commutators is such that resistance 5 is short circuited all of the time.

When the system is in operation the speed of the motor 1 is maintained constant by the regulating device 7. When the commutators are rotating at the same speed with the commutators 8′ and 9′ in the relative position shown, two circuits are alternately completed for short circuiting the resistance 5. One circuit extends from one terminal of the resistance 5, through brush 22, slip ring 8, shaft 11, conducting segment of the commutator 8′, brushes 25 and 27, conducting segment of the commutator 9′, shaft 15, slip ring 9, brush 23 to the other terminal of the resistance 5. The other circuit extends from one terminal of the resistance 5 through brush 22, slip ring 8, shaft 11, conducting segment of the commutator 8′, brushes 24 and 26, conducting segment of the commutator 9′, shaft 15, slip ring 9, brush 23 to the other terminal of the resistance 5.

As the load connected to the motor 1 increases the motor speed tends to decrease with respect to the speed of the synchronous motor so that the angular position of the commutator 9′ advances with respect to the angular speed position of the commutator 8′. In so doing the proportion of time the regulator short circuits the resistance is correspondingly decreased since during a portion of the time the brush 24 will be on the insulating segment of the commutator 8′ when the brush 26 is on the conducting segment of the commutator 9′ and the brush 24 will be on the conducting segment of the commutator 8′ when the brush 26 is on the insulating segment of the commutator 9′. Also during a portion of the time brush 25 will be on the conducting segment of the commutator 8′ when the brush 27 is on the insulating segment of the commutator 9′ and the brush 25 will be on the insulating segment of the commutator 8′ when the brush 27 is on the conducting segment of the commutator 9′. Therefore the field current of the motor 1 will be decreased sufficiently to maintain the speed of the motor at the desired value.

When the load connected to the motor has increased to such a value that the commutators are rotating at the same speed but the two commutators 8′ and 9′ are displaced 180 degrees relatively to each other from the positions shown in the drawing. It is apparent that when the brush 24 is in engagement with an insulating segment, the brush 26 is in engagement with a conducting segment and vice versa and that when the brush 25 is in engagement with an insulating segment the brush 27 is in engagement with a conducting segment and vice versa. Therefore the short circuit around the resistance 5 is completely removed under these conditions.

Thus it is apparent that the relative position of the two commutators 8′ and 9′ changes with variations in the load connected to the motor so that the interval of time during which the resistance is short circuited is varied to maintain the speed of the motor 1 constant.

So long as the load connected to the motor 1 does not become so great that the minimum field current of the motor 1, which flows when the resistance 5 is in the field circuit all of the time, is not small enough to increase the speed of the motor to the predetermined value; or so long as the load does not become so small that the maximum field current, which flows when the resistance 5 is short circuited all of the time, is not great enough to decrease the speed of the motor to the predetermined value, the above regulating device operates entirely satisfactorily. When, however, the load connected to the motor becomes so small that with the commutators 8 and 9′ in the relative position shown, the field current of the motor is not great enough to prevent the speed of the motor from exceeding the predetermined value, the commutator 8' rotates at a faster speed than the commutator 9' so that the resistance 5 is intermittently connected in the field circuit. Consequently the regulator operates to increase the speed of the motor 1 instead of decreasing the speed as it should under these conditions. Similarly, if the load becomes so great that, with the commutators 8' and 9' occupying a relative position 180 degrees from the relative position shown, the field current of the motor is not small enough to maintain the speed of the motor at the predetermined value, the commutator 8' rotates at a slower speed than the commutator 9' so that the resistance 5 is intermittently connected in field circuit. Consequently the regulator operates to decrease the speed of the motor instead of increasing the speed as it should under these conditions.

In order to prevent this undesirable operation of the regulator I provide the stops 29 and the stops 30 and 31 on the commutator 8' and 9' respectively. These stops are so arranged that the stops 29 and 30 are in engagement when the relative position of the two commutators is such that the resistance 5 is in the field circuit all of the time. Therefore if the speed of the motor 1 tends to decrease below the predetermined value when stops 29 and 30 are in engagement, the commutator 8' cannot rotate relatively to the commutator 9' and open the short circuit around the resistance 5. Consequently, the regulator still maintains the minimum field current flowing through the field winding 4 so as to keep the motor running as fast as possible.

It is evident that when stops 29 and 30 are in engagement, the synchronous motor 10 tends to drive the main motor 1. Since the synchronous motor 10 is, in practice, very much smaller than the main motor 1, the speed of which is being maintained constant, the load thrown on the motor 10 would be sufficient to pull it out of step. In order to prevent this occurring the spring clutch 19 is provided which is so designed that it allows the pulley 17 to slip before the load delivered by the motor 10 becomes sufficient to pull the motor out of step.

The stops 29 and 31 are so arranged that they are in engagement when the relative position of the two commutators is such that the resistance is short circuited all of the time. Therefore if the speed of the motor 1 tends to increase above the predetermined value when the stops 29 and 31 are in engagement, the commutator 8' cannot rotate relatively to the commutator 9' and insert the resistance 5 into the field circuit. Consequently the regulator still maintains the maximum field current flowing through the field winding so as to keep the motor running as slow as possible.

When the stops 29 and 31 are in engagement and the motor 1 tends to run at a higher speed than the predetermined speed it is apparent that the motor tends to drive the armature of synchronous motor 10 as a generator. The spring clutch 19 however prevents the synchronous motor, when acting as a generator, from being overloaded as it will allow the cone pulley 17 to slip as soon as the output of the synchronous motor reaches a predetermined value.

It is apparent that the speed at which the motor 1 is maintained constant may be changed by means of the speed changing device 16 or by changing the frequency of the supply circuit 13 in any well known manner so as to change the synchronous speed of the motor 10.

While I have described the embodiment of my invention shown in Fig. 1 as a regulating system for maintaining the speed of a motor constant, it is apparent that the arrangement disclosed is not limited to such a regulating system but is also applicable to a speed regulating system in which the speed of the motor 10 is variable and it is desired that the speed of the motor 1 vary in accordance with the speed of the motor 10.

Furthermore, it is apparent that my invention is not limited to a speed regulating system for an electric motor but is applicable to any regulating system having two rotatable elements which are respectively driven at a speed which is proportional to the condition to be regulated and at a speed in accordance with which said condition is to be controlled, the rotatable elements comprising circuit controlling segments arranged to control the duration of closure of a regulating circuit. For example, the motor 1 may be so connected and arranged that its speed varies in accordance with some electrical condition of an electric circuit such as the voltage or current and the circuit controlled by the circuit controlling segments so connected and arranged that variations in the duration of the closure of said circuit controls the condition to be regulated.

Fig. 2 shows a voltage regulating system embodying my invention. In this figure, 40 represents an alternating current generator, the voltage of which is to be controlled. The generator supplies current to an alternating current circuit 41 across which is connected the series alternating current motor 42 which is so adapted that its speed varies with the voltage of the generator 40. The motor 42 drives the shaft 11 of a regulator 7 which may be similar in construction to the regulator shown in Fig. 1, the shaft 15 of the regulator being driven at a constant speed by any suitable means not shown. The commutators of the regulator control the duration of a short circuit around the resistor 43 which is connected in series with the field winding 44 of the generator 40. In this embodiment of my invention, however, the stops 29, 30 and 31 of the regulator 7 are so arranged that the stops 29 and 31 are in engagement when the short circuit around the resistor is closed all of the time and the stops 29 and 30 are in engagement when the short circuit is open all of the time. Therefore when the voltage of the circuit tends to increase, the speed of the motor 42 tends to increase so that the commutator 8' advances with respect to the commutator 9' and the resistor 5 is in the field circuit more of the time, thereby decreasing the field current of the generator. When the voltage tends to decrease, the speed of the motor 42 tends to decrease so that the commutator 8' moves backwards with respect to the commutator 9' and the resistor 5 is short circuited more of the time, thereby increasing the field current of the generator.

It is believed that the operation of the embodiment of my invention shown in this figure will be obvious from the description of Fig. 1.

While I have shown and described several embodiments of my invention, it is evident that my invention is not limited thereto but seek to cover in the appended claims all those modifications and embodiments that fall within the true spirit and scope of my invention.

What I claim as new and desire to secure by Letters Patent of the United States, is:—

1. In a regulating system of the class described comprising a regulating circuit, and a regulator for controlling said circuit comprising a rotatable element arranged to be driven at a speed proportional to the condition to be regulated and a cooperating rotatable element driven at a speed in accordance with which said condition is to be controlled, said rotatable elements comprising cooperating circuit controlling segments arranged to control the duration of closure of said regulating circuit in accordance with the relative angular position of said rotatable elements, characterized by the fact that means are provided for limiting the angular movement of said rotatable elements with respect to each other.

2. In a regulating system of the class described the combination of a regulating circuit, a rotatable element, means arranged to drive said element at a speed proportional to the condition to be regulated, a second rotatable element, means arranged to drive said second element at a speed in accordance with which said condition is to be regulated, said rotatable elements being connected and arranged to control the duration of closure of said regulating circuit in accordance with the relative angular position of said rotatable elements with respect to each other, means for limiting the angular movement of said rotatable elements with respect to each other, and means interposed between one of said elements and its respective driving means arranged to allow relative rotation of said element with respect to its driving means when the power transmitted thereby exceeds a predetermined amount.

3. In combination, an electric motor the speed of which is to be controlled, a second electric motor arranged to rotate at a speed in accordance with which the speed of the first mentioned motor is to be controlled, rotatable elements respectively driven by said motors and comprising conducting segments connected and arranged to control the excitation of said first mentioned motor in accordance with the relative angular position of said rotatable elements, and means for limiting the angular movement of said rotatable elements with respect to each other.

4. In a speed regulating system for an electric motor having a resistance in the field circuit thereof, the combination of a shaft arranged to be driven by said motor, a second shaft in alignment with said first mentioned shaft, a second motor adapted to drive said second shaft, a clutch between said second motor and said second shaft arranged to slip when the power transmitted to or by the rotor of said second motor exceeds a predetermined value, interrupting devices carried by said two shafts connected and arranged to open and close a short circuit around the resistance in the field circuit of the motor for periods varying with the relative angular position of said interrupting devices, and stops associated with the respective shafts and arranged to engage each other when the angular displacement of said shafts exceeds a predetermined amount whereby further relative movement of said shafts is prevented.

In witness whereof, I have hereunto set my hand this 26th day of May, 1923.

LOUIS W. THOMPSON.

Certificate of Correction.

It is hereby certified that in Letters Patent No. 1,487,492, granted March 18, 1924, upon the application of Louis W. Thompson, of Schenectady, New York, for an improvement in "Regulating Systems," an error appears in the printed specification requiring correction as follows: Page 1, line 34, after the word "provided" insert the words *with stops;* and that the said Letters Patent should be read with this correction therein that the same may conform to the record of the case in the Patent Office.

Signed and sealed this 6th day of May, A. D. 1924.

[SEAL.]

KARL FENNING,
*Acting Commissioner of Patents.*